April 13, 1937.  A. A. COOPER  2,076,618
COIL TESTER
Filed Dec. 13, 1935
Fig. 1.
Fig. 2.
Fig. 3.
Fig. 4.
Fig. 5.
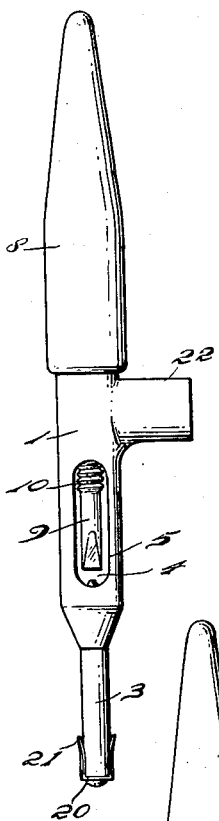
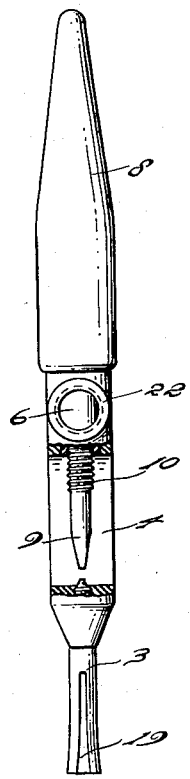
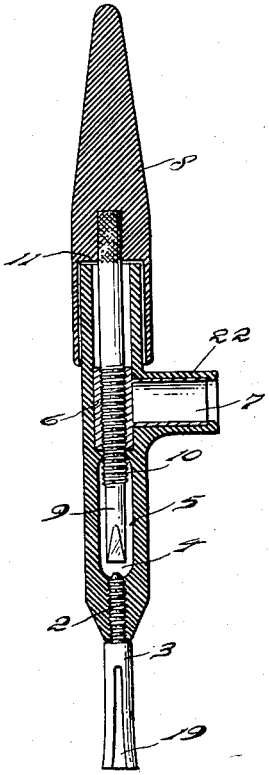
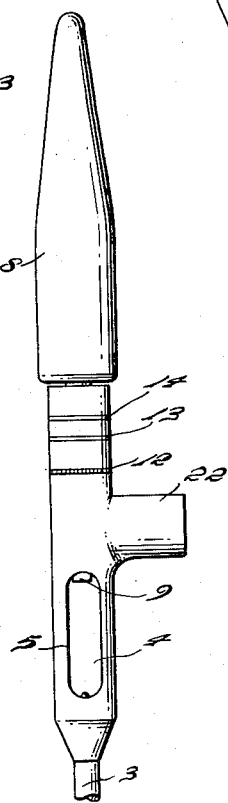
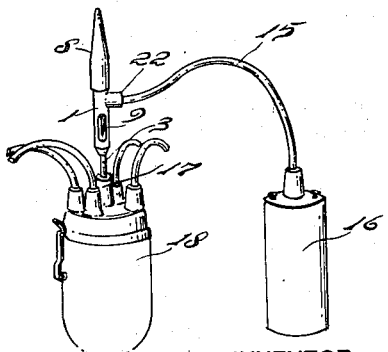
INVENTOR
Ansel A. Cooper
BY
Herbert S. Fairbanks
ATTORNEY Patented Apr. 13, 1937

2,076,618

UNITED STATES PATENT OFFICE 2,076,618

COIL TESTER

Ansel A. Cooper, Philadelphia, Pa.

Application December 13, 1935, Serial No. 54,195

3 Claims. (Cl. 175—183)

The object of this invention is to devise a novel coil tester which will accurately test the condition of the ignition coil of an engine, and to devise a coil tester which can be used by an unskilled operator.

With the above and other objects in view as will hereinafter clearly appear, my invention comprehends a novel coil tester.

It further comprehends a novel portable coil tester which simulates a fountain pen so that it can be readily carried by the user; said tester having a conducting member adapted to be received in or connected to the high tension contact of the distributor, and to form one contact of an adjustable spark gap, the movable contact being formed by a screw driver carried by an insulated grasping portion relatively adjustable with respect to said conducting member.

It further comprehends novel means for adjusting the spark gap and indicating the condition of the coil under test.

Other novel features of construction and advantage will hereinafter more clearly appear in the detailed description and the appended claims.

For the purpose of illustrating the invention, I have shown in the accompanying drawing typical embodiments of it, which, in practice, will give satisfactory and reliable results. It is, however, to be understood that the various instrumentalities of which my invention consists can be variously arranged and organized, and my invention is not limited to the exact arrangement and organization of these instrumentalities as herein set forth.

Figure 1 is a front elevation of a coil tester, embodying my invention.

Figure 2 is a side elevation partly in section.

Figure 3 is a longitudinal section.

Figure 4 is a front elevation of a portion of the coil tester, showing the parts in a different relation from that seen in Figure 1.

Figure 5 is a front elevation of the coil tester in conjunction with a conventional distributor.

Similar numerals indicate corresponding parts.

Referring to the drawing:—

1 designates the body portion of a coil tester embodying my invention. The body portion is formed of rubber, bakelite or other suitable insulating material. The body portion is internally threaded at its forward end, as at 2, to receive the threaded end of a conducting member 3 which extends beyond the body portion and has its contact end adapted to make electrical connection with a contact forming a part of the circuit of the ignition coil. The body portion is chambered as at 4 and the inner end of the conducting member 3 extends into such chamber to form one contact of an adjustable spark gap.

The side wall of the body portion is slotted at 5 so that the spark produced in the chamber 4 will be visible.

The body portion has secured in it an internally threaded tube or sleeve 6 to which is connected a conductor receiving socket 7. The sleeve and socket are made of conducting material and are preferably molded into the body portion. The cap or grasping portion 8 is made of insulating material and preferably tapers towards its outer or rear end so that when assembled with the body portion, the coil tester simulates a fountain pen.

The cap 8 has fixed to its rear end a conducting member 9, preferably in the form of a screw driver at its forward end and having its shank provided with a micrometer thread 10 to engage the internal threads of the tube or sleeve 6. The forward end of the cap 8 is recessed as at 11 to receive the rear end of the body portion.

The body portion at its rear end is provided with spaced graduations 12, 13, and 14 in the form as illustrated of circular marks which may be of contrasting colors.

One end of the high tension conductor 15 from the coil 16 to be tested is withdrawn from the engagement with the contact 17 of the distributor 18, and inserted in the socket 7 of the coil tester, and the conducting member 3 is placed in the socket of the distributor from which the high tension conductor 15 was withdrawn.

This conducting member 3 may be in the form of a solid rod as in Figure 1 or it may be split at its forward end, as at 19, in Figures 2 and 3, to form a spring contact which will engage sockets of different diameters.

If desired a spring clip 20 may be employed in the form of a strip of spring metal apertured to receive the conducting member 3 and having two or more spring arms 21.

The operation of my novel coil tester will now be apparent to those skilled in this art and is as follows:—

Assuming that the coil tester has been connected as explained and as shown in Figure 5, the engine is started. The operator unscrews the cap to widen the gap between the juxtaposed ends of the conducting member until the engine slows down or stops.

The instrument is calibrated so that if the cap is unscrewed to uncover the first graduation 12 and the engine slows down or stops, then the coil is in bad condition and should be renewed. Any points between the graduations 13 and 14 indicate a coil in good working condition, the graduation 14 indicating a higher efficiency than that of the graduation 13 and substantially that of a new coil. The offset 22 of the body portion forms a stop to limit the forward movement of the cap so that the juxtaposed ends of the conducting members 3 and 9 cannot be injured.

My present invention provides a coil tester which is portable, simple and compact and which enables an unskilled person to obtain an accurate and reliable test of the working condition of a coil.

Having thus described my invention what I claim as new and desire to secure by Letters Patent is:—

1. In a coil tester, a body portion having a chamber open to the atmosphere, a rod extending from said chamber forwardly of said body portion and adapted to connect with the high tension contact of a distributor, a cap, a screw driver fixed to the cap and longitudinally movable into said body portion to form with said rod a variable spark gap on relative movement of said cap and body portion, means to visibly indicate the condition of a coil being tested, and means electrically connected with said screw driver and adapted to receive the high tension conductor of a coil to be tested.

2. In a coil tester, a body portion having a chamber open to the atmosphere, a conducting member extending from said chamber, a cap, a screw driver fixed to said cap and movably carried by said body portion to form with said conducting member a variable spark gap on relative movement of said cap and body portion, graduations on said body portion uncovered by said cap to determine the condition of a coil under test, and means electrically connected with said screw driver to receive an electric conductor from a coil to be tested.

3. In a coil tester, a body portion having an offset portion, a chamber and slots from said chamber through its outer wall, a conducting member extending from said chamber forwardly of the body portion, a threaded sleeve in the body portion, a conductor receiving member extending from said sleeve into said offset portion, a second conducting member in threaded engagement with said sleeve, and forming with the first conducting member a spark gap, a cap secured to said second conducting member, said offset portion serving as a stop for said cap to limit the forward movement of said first conducting member, and means to indicate the relative positions of said cap and body portion and thereby the condition of a coil under test.

ANSEL A. COOPER.